United States Patent
Michaels (10) Patent No.: US 7,921,145 B2
(45) Date of Patent: Apr. 5, 2011

(54) EXTENDING A REPETITION PERIOD OF A RANDOM SEQUENCE

(75) Inventor: Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 930 days.

(21) Appl. No.: 11/751,783

(22) Filed: May 22, 2007

(65) Prior Publication Data
US 2008/0294710 A1 Nov. 27, 2008

(51) Int. Cl.
*G06F 1/02* (2006.01)

(52) U.S. Cl. ......................................... 708/250; 708/252

(58) Field of Classification Search .................. 708/250, 708/252
See application file for complete search history.

(56) References Cited

U.S. PATENT DOCUMENTS

| | | | |
|---|---|---|---|
| 3,564,223 A | 2/1971 | Harris et al. |
| 4,646,326 A | 2/1987 | Backof, Jr. et al. |
| 4,703,507 A | 10/1987 | Holden |
| 5,077,793 A | 12/1991 | Falk et al. |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,598,476 A | 1/1997 | LaBarre et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,924,980 A | 7/1999 | Coetzee |
| 5,937,000 A | 8/1999 | Lee et al. |
| 6,014,446 A * | 1/2000 | Finkelstein ................. 380/46 |
| 6,023,612 A | 2/2000 | Harris et al. |
| 6,038,317 A | 3/2000 | Magliveras et al. |
| 6,078,611 A | 6/2000 | La Rosa et al. |
| 6,331,974 B1 | 12/2001 | Yang et al. |
| 6,377,782 B1 | 4/2002 | Bishop et al. |
| 6,570,909 B1 | 5/2003 | Kansakoski et al. |
| 6,614,914 B1 | 9/2003 | Rhoads et al. |

(Continued)

FOREIGN PATENT DOCUMENTS
EP 0 849 664 A2 6/1998
(Continued)

OTHER PUBLICATIONS
U.S. Appl. No. 11/928,013, Alan J. Michaels.
(Continued)

*Primary Examiner* — Chuong D Ngo
(74) *Attorney, Agent, or Firm* — Fox Rothschild, LLP; Robert J. Sacco (57) ABSTRACT

A method is provided for extending a sequence repetition period of a random number generator in systems based on the availability of random sequences. The method includes performing RNS arithmetic operations to express a random number in a sequence as RNS residue values. Each generated random number has a value between zero and n!−1. The method also includes converting each of the RNS residue values to a relatively prime base number system so that each of the RNS residue values includes at least one digit. The method further includes generating an arbitrary permutation ordering of output sequence numbers using a select combination of digits associated with each of the RNS residue values. The arbitrary permutation ordering is applied to a cyclic structure having n elements. Each of the n elements has an associated output sequence number.

27 Claims, 4 Drawing Sheets

U.S. PATENT DOCUMENTS

| | | | |
|---|---|---|---|
| 6,744,893 | B1 | 6/2004 | Fleming-Dahl |
| 6,754,251 | B1 | 6/2004 | Sriram et al. |
| 6,766,345 | B2 | 7/2004 | Stein et al. |
| 6,842,479 | B2 | 1/2005 | Bottomley |
| 6,986,054 | B2 | 1/2006 | Kaminaga et al. |
| 7,023,323 | B1 | 4/2006 | Nysen |
| 7,027,598 | B1* | 4/2006 | Stojancic et al. .............. 380/28 |
| 7,069,492 | B2 | 6/2006 | Piret |
| 7,076,065 | B2 | 7/2006 | Sherman et al. |
| 7,078,981 | B2 | 7/2006 | Farag |
| 7,079,651 | B2 | 7/2006 | Den Boer |
| 7,095,778 | B2 | 8/2006 | Okubo et al. |
| 7,190,681 | B1 | 3/2007 | Wu |
| 7,200,225 | B1 | 4/2007 | Schroeppel |
| 7,233,969 | B2 | 6/2007 | Rawlins et al. |
| 7,233,970 | B2 | 6/2007 | North et al. |
| 7,269,198 | B1 | 9/2007 | Elliott et al. |
| 7,529,292 | B2 | 5/2009 | Bultan et al. |
| 7,643,537 | B1 | 1/2010 | Giallorenzi et al. |
| 7,779,060 | B2 | 8/2010 | Kocarev et al. |
| 2002/0099746 | A1 | 7/2002 | Tie et al. |
| 2003/0044004 | A1 | 3/2003 | Blakley et al. |
| 2004/0001556 | A1 | 1/2004 | Harrison et al. |
| 2004/0059767 | A1* | 3/2004 | Liardet ........................ 708/491 |
| 2004/0196212 | A1 | 10/2004 | Shimizu |
| 2005/0031120 | A1 | 2/2005 | Samid |
| 2005/0050121 | A1 | 3/2005 | Klein et al. |
| 2005/0207574 | A1 | 9/2005 | Pitz et al. |
| 2005/0274807 | A1 | 12/2005 | Barrus et al. |
| 2006/0123325 | A1 | 6/2006 | Wilson et al. |
| 2006/0209932 | A1 | 9/2006 | Khandekar et al. |
| 2006/0251250 | A1 | 11/2006 | Ruggiero et al. |
| 2008/0016431 | A1 | 1/2008 | Lablans |
| 2008/0095215 | A1 | 4/2008 | McDermott et al. |
| 2008/0198832 | A1 | 8/2008 | Chester |
| 2008/0263119 | A1 | 10/2008 | Chester et al. |
| 2008/0294710 | A1 | 11/2008 | Michaels |
| 2008/0294956 | A1 | 11/2008 | Chester et al. |
| 2008/0304553 | A1 | 12/2008 | Zhao et al. |
| 2008/0304666 | A1 | 12/2008 | Chester et al. |
| 2008/0307022 | A1 | 12/2008 | Michaels et al. |
| 2008/0307024 | A1 | 12/2008 | Michaels et al. |
| 2009/0034727 | A1 | 2/2009 | Chester et al. |
| 2009/0044080 | A1 | 2/2009 | Michaels et al. |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |
| 2009/0296860 | A1 | 12/2009 | Chester et al. |
| 2009/0300088 | A1 | 12/2009 | Michaels et al. |
| 2009/0310650 | A1 | 12/2009 | Chester et al. |
| 2009/0323766 | A1 | 12/2009 | Wang et al. |
| 2009/0327387 | A1 | 12/2009 | Michaels et al. |
| 2010/0111296 | A1 | 5/2010 | Brown et al. |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 143283 | 12/2009 |

OTHER PUBLICATIONS

Barile, Margherita, "Bijective," From MathWorld-A Wolfram Web Resource, created by Eric W. Weisstein. http://mathworld.wolfram.com/Bijective.html, 2002.

Weisstein, Eric W., "Injection," From MathWorld-A Wolfram Web Resource. http://mathworld.wolfram.com/Injection.html, 2005.

Weisstein, Eric W. "Surjection," From MathWorld-A Wolfram Web Resource, http://mathworld.wolfram.com/Surjection.html, 2002.

Yen, et al., (1999) "Residual Number Sysetm Assisted CDMA: A New System Concept", In: ACTS'99, Jun. 8-11, 1999, Sorrento, Italy.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Morsche et al., "Signals and Systems," lecture notes, University of Eindhoven, The Netherlands (1999).

Pourbigharaz F. et al, Modulo-Free Architecture for Binary to Risidule Transformation with Respect to (2m-1, 2m, 2m+1) Moduli Set, IEEE International Symposium on Circuits and Systems, May 30-Jun. 2, 1994, pp. 317-320, vol. 2, London, UK.

Knuth, D.E., "The Art of Computer Programming, Third Edition; vol. 2 Seminumerical Algorithms", Feb. 2005, Addison-Wesley, Boxton 310200, XP002511903, pp. 142-146, 284-292.

De Matteis, A., et al., "Pseudorandom Permutation", Journal of Computational and Applied Mathematics, Elsevier, Netherlands, vol. 142, No. 2, May 15, 2002, pp. 367-375, XP007906923, ISSN: 0377-0427.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XP002558039.

Manikandan, et al, "A Novel Pulse Based Ultrawide Band System Using Chaotic Spreading Sequences" Communication Systems Software and Middleware, 2007. Comsware 2007. 2ND International Conference on, IEEE, PI, Jan. 1, 2007, pp. 1-5, XP031113946 ISBN: 978-1-4244-0613-5; p. 1, page 5.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Knuth, D E: "The Art of Computer Programming, 3.2.2 Other Methods" The Art of Computer Programming. Vol. 2: Seminumerical Algorithms, Boston, MA: Addison-Wesley, US, Jan. 1, 1998, pp. 26-40, XP002409615, ISBN: 978-0-0201-89684-8.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, NewYork, NY US, Vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2003].

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems, New York, NY : IEEE, US, vol. 3, May 6, 2001, pp. 216-216, XP010544114, ISBN: 978-0-7803-6685-5.

Michaels, et al., U.S. Appl. No. 12/056,024, filed Mar. 26, 2008, entitled "Selective Noise Cancellation of a Spread Spectrum Signal".

Chester, et al., U.S. Appl. No. 12/116,104, filed May 6, 2008, Entitled, "A Closed Galois Field Cryptographic System".

Michaels, et al., U.S. Appl. No. 12/117,086, filed May 8, 2008, Entitled "Cryptographic System Including a Mixed Radix Number Generator With Chosen Statistical Artifacts".

Michaels, et al., U.S. Appl. No. 12/129,197, filed May 29, 2008, entitled "Digital Generation of an Accelerated or Decelerated Chaotic Numerical Sequence".

Michaels, et al., U.S. Appl. No. 12/129,654, filed May 29, 2008, entitled "Sine/Cosine Generator".

Chester, et al., U.S. Appl. No. 12/131,386, filed Jun. 2, 2008, Entitled "Adaptive Correlation".

Chester, et al., U.S. Appl. No. 12/137,593, filed Jun. 12, 2008, entitled "Featureless Coherent Chaotic Amplitude Modulation".

Michaels, Alan, U.S. Appl. No. 12/201,021, filed Aug. 29, 2008, entitled, "Multi-Tier AD-HOC Network Communications".

Michaels, Alan, U.S. Appl. No. 12/248,131, filed Oct. 9, 2008, entitled "AD-HOC Network Acquisition Using Chaotic Sequence Spread Waveform".

Michaels, et al., U.S. Appl. No. 12/496,214, filed Jun. 1, 2009, entitled "Anti-Jam Communications Having Selectively Variable Papr Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2009, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jun. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. 1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE Africon 2002 Oct. 2, 2002,Oct. 4, 2002, pp. 841-846, XP002575052 Retrieved from the Internet: URL:http://ieeexplore. ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld-A Wolfram Web Resource, created by Eric W. Weisstein, [online] [retrieved on Nov. 8, 2010] Retrieved from the Internet: <http://mathworld.wolfram.com/bijective.html>.

Weisstein, E., Surejection:, From MathWorld-A Wolfram Web Resource [online] [retrieved on Nov. 8, 2010] Retrieved from the Internet: <http://mathvvorld.wolfram.com/surjection.html>.

Weisstein, E., Surejection:, From MathWorld-A Wolfram Web Resource [online] [retrieved on Nov. 8, 2010] Retrieved from the Internet: http://mathworld wolfrarn.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/U52009/0069118.

Harris Corp., European Search Report mailed Mar. 4, 2010, Patent Application No. 08009745.4.

* cited by examiner

EXTENDING A REPETITION PERIOD OF A RANDOM SEQUENCE

BACKGROUND OF THE INVENTION

1. Statement of the Technical Field

The inventive arrangements relate to communications systems. More particularly, the inventive arrangements relate to a method and apparatus for generating an arbitrary permutation ordering of numbers and its application in a variety of communication system structures, including random number generators.

2. Description of the Related Art

Many systems requiring random sequences typically include ring generators and/or other cyclic structures. A ring generator is a simple structure over a finite field that exhaustively produces possible outputs through repeated mapping. The mapping is some combination of an additive and a multiplicative mapping, with irreducible polynomials being ideal. For example, a ring generator includes repeated computations of an irreducible polynomial $f(x)=3x^3+3x^2+x$ on a finite Galois field GF[11]. A main limitation of a ring generator is that its orbits are highly deterministic. As such, knowledge of a mapping and current finite field conditions gives complete knowledge of an output sequence.

In systems requiring random sequences, ring generators are often employed in algorithms for modifying a sequence of data bits. Such algorithms typically include arithmetic operations to be performed in a finite or Galois field. A finite or Galois field GF[p] is a field that contains only finitely many elements, namely $\{0, 1, 2, \ldots, p-1\}$. As such, all arithmetic operations performed in the finite or Galois field result in an element within that field. The finite or Galois field GF[p] has a finite field size defined by the Galois characteristic p. As such, an output sequence created through repeated mapping repeats every $p^{th}$ element. This repetitive behavior produces correlations thereby making the decoding of an output sequence relatively easy when p is small. Consequently, the algorithms also typically include operations for expanding the finite or Galois field size so that the period of repetition is increased.

There are many methods known in the art for expanding a finite or Galois field GF[p] where p is an integer power of two (2), $2^k$. The simplest such method for expanding a finite or Galois field $GF[2^k]$ includes increasing a number of input bits. Other methods include coupling the ring generator to other generators. For example, the ring generator may be coupled to an arbitrary number of other generators (assumed to have a mutually prime characteristic) comprised of digital hardware implementing the Chinese Remainder Theorem (CRT). As should be understood, CRT computations are performed to combine mixed-radix computations. CRT computations may only be used if inputs to the generator are mutually prime numbers. Despite the advantages of this method, it suffers from certain drawbacks. For example, this method is cyclic and fixed by nature. CRT computations of elements in odd prime number bases with digital hardware are computationally inefficient. Also, an output sequence of the generator is highly deterministic if the mutually prime numbers are known a priori.

These systems requiring random sequences also typically rely on deterministic scrambling methods to help mask an output sequence so that an outside observer is unable to determine the output sequence. Scrambling methods are used to increase the entropy of an output relative to any given sequence of inputs. As such, these systems include scramblers. A scrambler operates according to a deterministic scrambling algorithm so that the original signal can be recovered from a scrambled signal. Deterministic scrambling methods and associated algorithms are well known to persons skilled in the art, and therefore will not be described in detail herein.

However, it should be understood that one such deterministic scrambling method includes implementing a deterministic scrambling algorithm that uses substitution box (S-box) functions to scramble data. An S-box is an array of numbers used to add additional variance into an output sequence of a system in order to protect the output sequence from reverse engineering. An S-box function often has a number of desired properties. For example, a deterministic scrambling algorithm uses an S-box, but a deterministic descrambling algorithm uses an inverse of the S-box. As such, the S-box function is invertible so that an output sequence can be obtained from a scrambled sequence. This deterministic scrambling method also includes creating complex mixing networks, such as a Feistel structure. As should be understood, a Feistel structure combines multiple rounds of repeated operations. Such operations include, but are not limited to, bit-shuffling, nonlinear functions, and linear functions. Despite the advantages of this deterministic scrambling method, it suffers from certain drawbacks. For example, this deterministic scrambling method is time-invariant. This deterministic scrambling method can also be resource intensive.

In view of the forgoing, there remains a need for a method for expanding a finite or Galois field size that is more computationally efficient than conventional finite held expansion methods. There is also a need for an invertible method for increasing the entropy of an output sequence that is more computationally efficient than conventional deterministic scrambling methods. Such methods also need to be designed for providing a high degree of security feature to a system. Most significantly, there is further a need for a method and apparatus for generating an arbitrary permutation ordering of numbers that can be used in a variety of communication system applications.

SUMMARY OF THE INVENTION

The invention concerns a method for extending a sequence repetition period of a random number generator in a system based on the availability of one or more random sequences. The method includes performing one or more RNS arithmetic operations to express a random number in a random number sequence as one or more RNS residue values. The method also includes converting each of the RNS residue values to a relatively prime number system so that each of the RNS residue values includes at least one digit. The method further includes generating an arbitrary permutation ordering of output sequence numbers using a select combination of digits associated with each of the RNS residue values. The arbitrary permutation ordering is determined using a cyclic structure.

According to an aspect of the invention, the method includes selecting each random number of the random number sequence to have a value which can range between zero and n!−1. The method also includes selecting the cyclic structure to have n elements. The method further includes associating each of the output sequence numbers with a respective element of the n elements.

According to another aspect of the invention, the method includes calculating the RNS residue values using relatively prime numbers as moduli. The moduli are determined by determining a decimal number defined by n! as a product of relatively prime numbers. The converting step further comprises converting each of the RNS residue values to a different relatively prime number system.

According to yet another aspect of the invention, the method includes choosing the select combination of digits so that a range of values which can be determined by the digits is equal to a number of available unselected elements in the cyclic structure. The method also includes using a value of the select combination of digits to select an available unselected element in the cyclic structure. The method further includes using the Chinese Remainder Theorem to combine at least two digits associated with at least two RNS residue values to obtain a digit having a different number base equal to the product of the at least two digits. The method includes using the digit having a different number base to select an available unselected element in the cyclic structure.

A ring generator is also provided. The ring generator is comprised of a computing means, a converting means, and a permutation means. The computing means is configured to perform one or more RNS arithmetic operations to express a random number in a random number sequence as one or more RNS residue values. The converting means is configured to convert each of the RNS residue values to a relatively prime number system so that each of the RNS residue values includes at least one digit. The permutation means is configured to generate an arbitrary permutation ordering of output sequence numbers using a select combination of digits associated with each of the RNS residue values. The arbitrary permutation ordering is determined using a cyclic structure.

According to an aspect of the invention, each random number in the random number sequence has a value within a range of zero to n!−1. The cyclic structure has n elements. Each of the output sequence numbers is associated with a respective element of the n elements.

According to another aspect of the invention, the computing means is further configured to calculate the RNS residue values using relatively prime numbers as moduli. The relatively prime numbers are selected to have a product equal to a decimal number defined by n!. The converting means is further configured to convert each of the RNS residue values to a different relatively prime number system.

According to yet another aspect of the invention, the select combination of digits are chosen so that a range of values which can be determined by the digits is equal to a number of available unselected elements in the cyclic structure. The permutation means is configured to use a value of the select combination of digits to select an available unselected element in the cyclic structure. The permutation means is also configured to use the Chinese Remainder Theorem to combine at least two digits associated with at least two RNS residue values to obtain a digit having a different number base equal to the product of the at least two digits. The permutation means is further configured to use the Chinese Remainder Theorem to combine with one or more additional cyclic ring generators. The permutation means is configured to use the digit having a different number base to select an available unselected element in the cyclic structure.

A machine-readable medium is also provided. The machine-readable medium has stored thereon instructions, which when executed by a machine, cause the machine to perform certain operations. The operations include performing one or more RNS arithmetic operations to express a random number in a random number sequence as one or more RNS residue values. The operations also include converting each of the RNS residue values to a relatively prime number system so that each of the RNS residue values includes at least one digit. The operations further include generating an arbitrary permutation ordering of output sequence numbers using a select combination of digits associated with each of the RNS residue values. The arbitrary permutation ordering is determined using a cyclic structure.

According to an aspect of the invention, each random number in the random number sequence has a value between zero and n!−1. The cyclic structure has n elements. Each of the output sequence numbers is associated with a respective element of the n elements.

According to another aspect of the invention, the machine-readable medium comprises instructions to cause the operation of calculating the RNS residue values using relatively prime numbers as moduli. The relatively prime numbers are selected to have a product comparable to an integer multiple of the decimal number defined by n!. The machine-readable medium also comprises instructions to cause the operation of converting each of the RNS residue values to a different relatively prime number system.

According to yet another aspect of the invention, the machine-readable medium comprises instructions to cause the operation of choosing the select combination of digits so that a range of values which can be determined by the digits is equal to a number of available unselected elements in the cyclic structure. The machine-readable medium also comprises instructions to cause the operation of using a value of the select combination of digits to select an available unselected element in the cyclic structure. The machine-readable medium further comprises instructions to cause the operation of using a Chinese Remainder Theorem to combine at least two digits associated with at least two RNS residue values to obtain a digit having a different number base equal to the product of the at least two digits. The machine-readable medium comprises instructions to cause the operation of using the digit having a different number base to select an available unselected element in the cyclic structure.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Some embodiments of the present invention provide an algorithm for extending a random number sequences repetition period. Such embodiments also provide an algorithm for generating an arbitrary permutation ordering of numbers. In this regard, it should be appreciated that such an algorithm can be used in a variety of communication system applications. For example, such an algorithm can be implemented in a ring generator or other cyclic structure for efficiently expanding a size of a finite or Galois field. The algorithm can also be implemented in a deterministic scrambling method. In such a scenario, the algorithm can be applied to bits of an output sequence for masking the same. The algorithm can further be implemented in a pseudo-random number generator for increasing a random number sequence's repetition period.

Figure 1:
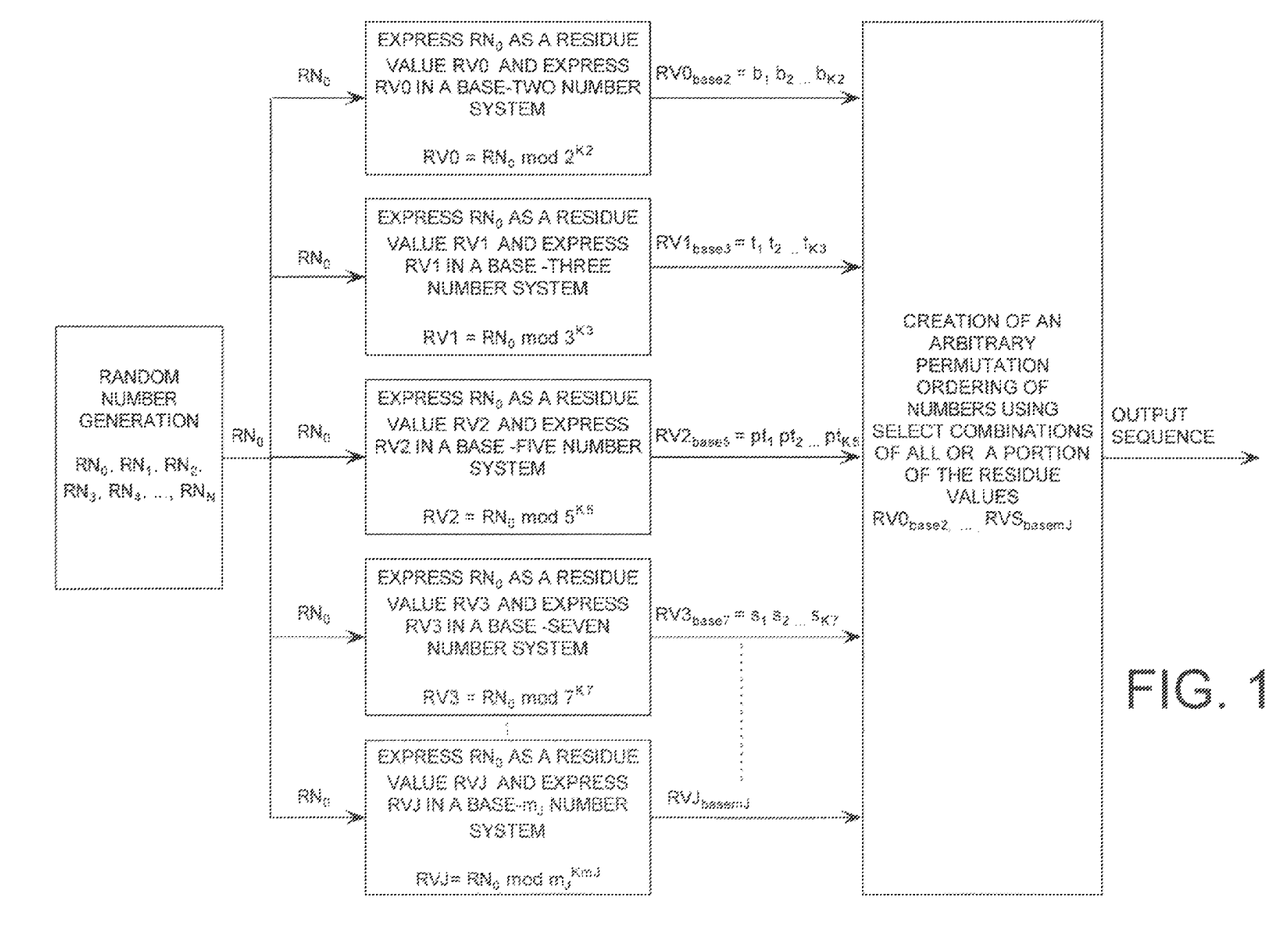
FIG. 1 is a conceptual diagram of an algorithm for extending a sequences repetition period that is useful for understanding the invention.

Referring now to FIG. 1, there is provided a conceptual diagram of an algorithm for extending a sequence's repetition period. In this regard, it should be appreciated that a sequence of random numbers $RN_0, \ldots, RN_N$ is generated. Each random number $RN_0, \ldots, RN_N$ has a value between zero (0) and n!−1. The sequence of random numbers $RN_0, \ldots, RN_N$ repeats after a certain period of time. As such, an algorithm is employed to extend this period of time. This algorithm is described in great detail below (in relation to FIGS. 1-2).

Referring again to FIG. 1, the algorithm begins with a random number $RN_0$ that has been computed by some defined arithmetic process. Such arithmetic processes are well known to persons skilled in the art. Therefore, the defined arithmetic process will not be described in detail herein. However, it should be appreciated that the arithmetic process can be an arithmetic process for computing a pseudo-random number or a pseudo-chaotic number. It should also be appreciated that each random number of the random number sequence $RN_0, \ldots, RN_N$ can have a decimal value between zero (0) and n!−1. n! is a factorial equivalent of a decimal value representing the total possible values that members of the random number sequence $RN_0, \ldots, RN_N$ can equal.

The random numbers $RN_0, \ldots, RN_N$ can be expressed in a decimal number system representation or a binary number system representation. If the random number sequence $RN_0, \ldots, RN_N$ is expressed in a decimal number system representation, then the random number sequence $RN_0, \ldots, RN_N$ is a decimal sequence of digits. The term "digit" as used herein refers to a single character in a weighted numbering system. For example, a sequence 45 has a digit 4 and a digit 5. The digit 4 is weighted such that it is ten (10) times the value of the digit 5. Each digit of the decimal sequence has a value of zero (0), one (1), two (2), three (3), four (4), five (5), six (8), seven (7), eight (8) or nine (9). The decimal sequence has a digit length selected in accordance with a particular algorithm application. If the random number sequence $RN_0, \ldots, RN_N$ is expressed in a weighted binary number system representation, then each random number $RN_0, \ldots, RN_N$ is a binary sequence of digits. Each digit of the binary sequence has a zero (0) value or a one (1) value. The binary sequence has a digit length selected in accordance with a particular algorithm application.

Each random number $RN_0, \ldots, RN_N$ can be expressed as a set of residue number system (RNS) residue values $RV0, \ldots, RVJ$ using RNS arithmetic operations, i.e. modulo operations. Modular arithmetic is well known to persons skilled in the art. Thus, such operations will not be described in great detail herein. However, it should be appreciated that a RNS residue value can be defined by mathematical Equation (1).

$$RV_p = RN_n \text{ modulo } m_p \quad (1)$$

where
$RV_p$ is a RNS residue value representing a random number $RN_n$ modulo $m_p$;
$RN_n$ is one of the random numbers in the random number sequence $RN_0, \ldots, RN_N$; and
$m_p$ is a modulus which can have a value $base^k_{base}$.

The moduli $m_p = m_0^{km0}, m_1^{km1}, \ldots, m_J^{kmJ}$ are selected to have a value defined by the unique prime factorization of n!. As noted above, n! is the number of total possible values that the random number sequence $RN_0, \ldots, RN_N$ can equal. In this regard, it should be appreciated that the Fundamental Theorem of Arithmetic (FTA) can be used to write the random number as a unique product of relatively prime numbers, which are automatically mutually prime when separated into distinct powers of individual primes. The phrase "relatively prime numbers" as used herein refers to a collection of numbers having a greatest common divisor of one (1). For example, a factorial of eight (8!) equals a decimal number having a value of forty thousand three hundred twenty (40, 320). This decimal number can be expressed as a product of prime numbers ($40,320 = 2^{K2} \cdot 3^{K3} \cdot 5^{K5} \cdot 7^{K7} = 2^7 \cdot 3^2 \cdot 5^1 \cdot 7^1$). In such a scenario, each RNS arithmetic operation employed for expressing each random number in the sequence $RN_0, \ldots, RN_K$ as a set of RNS residue values $RV0, \ldots, RVJ$ can use the relatively prime numbers $2^7, 3^2, 5^1, 7^1$ as a moduli $m_0^{km0}, m_1^{km1}, m_2^{km2}, m_3^{km3}$, respectively. As should be understood, residue number systems yield the largest potential for gains in computational efficiency when the individual moduli are as small as possible. Further, factors of two (2) are a special case (being inherently efficient) since digital hardware is optimized for binary arithmetic.

Referring again to FIG. 1, each RNS residue value $RV0, \ldots, RVJ$ can be expressed in a different relatively prime number system representation. In this regard, it should be appreciated an advantage of using different relatively prime number systems is that operations in one (1) residue space can be performed independently from other residue spaces. After independently performing a plurality of residue computations, the results of said computations can be recombined via an algorithm, such as a Chinese Remainder Theorem algorithm. The recombination results can be used to efficiently implement a permutation ordering of numbers that is the same as a permutation ordering of numbers defined by the random numbers $RN_0, \ldots, RN_N$.

According to an embodiment of the invention, a RNS residue value $RV0$ can be expressed in a binary number system (i.e., a base-two system) representation. As such, the residue value $RV0_{base2}$ is a sequence of binary digits. Each binary digit has a value of zero (0) or one (1). The RNS residue value $RV1$ can be expressed in a tertiary number system (i.e., a base-three system) representation. Accordingly, the RNS residue value $RV1_{base3}$ is a sequence of tertiary digits. Each tertiary digit has a value of zero (0), one (1) or two (2). The RNS residue value $RV2$ can be expressed in a pentiary number system (i.e., a base-five system) representation. Hence, the RNS residue value $RV2_{base5}$ is a sequence of pentiary digits. Each pentiary digit has a value of zero (0), one (1), two (2), three (3), or four (4). The RNS residue value $RV3$ can be expressed in a septiary number system (i.e., a base-seven system) representation. Therefore, the RNS residue value $RV3_{base7}$ is a sequence of septiary digits. Each septiary digit has a value of zero (0), one (1), two (2), three (3), four (4), five (5), or six (6). Still, the invention is not limited in this regard.

Referring again to FIG. 1, either a partial or complete arbitrary permutation ordering of numbers is created using select combinations of all or a portion of the RNS residue values $RV0_{base2}, \ldots, RVJ_{basemJ}$. In this regard, it should be appreciated that each RNS residue value $RV0_{base2}, \ldots, RVJ_{basemJ}$ is comprised of one or more digits. For example, the RNS residue value $RV0_{base2}$ can be comprised of binary digits $b_1\ b_2 \ldots b_{K2}$. The RNS residue value $RV1_{base3}$ can be comprised of tertiary digits $t_1\ t_2 \ldots t_{K3}$. The RNS residue value $RV2_{base5}$ can be comprised of a pentiary digit $pt_1\ pt_2 \ldots pt_{K5}$. The RNS residue value $RV3_{base7}$ can be comprised of a septiary digit $s_1\ s_2 \ldots s_{K7}$. In such a scenario, an arbitrary permutation ordering of output sequence numbers can be determined and applied to a cyclic structure such as that shown in FIG. 2A.

Figures 2A, 2B, 2C:
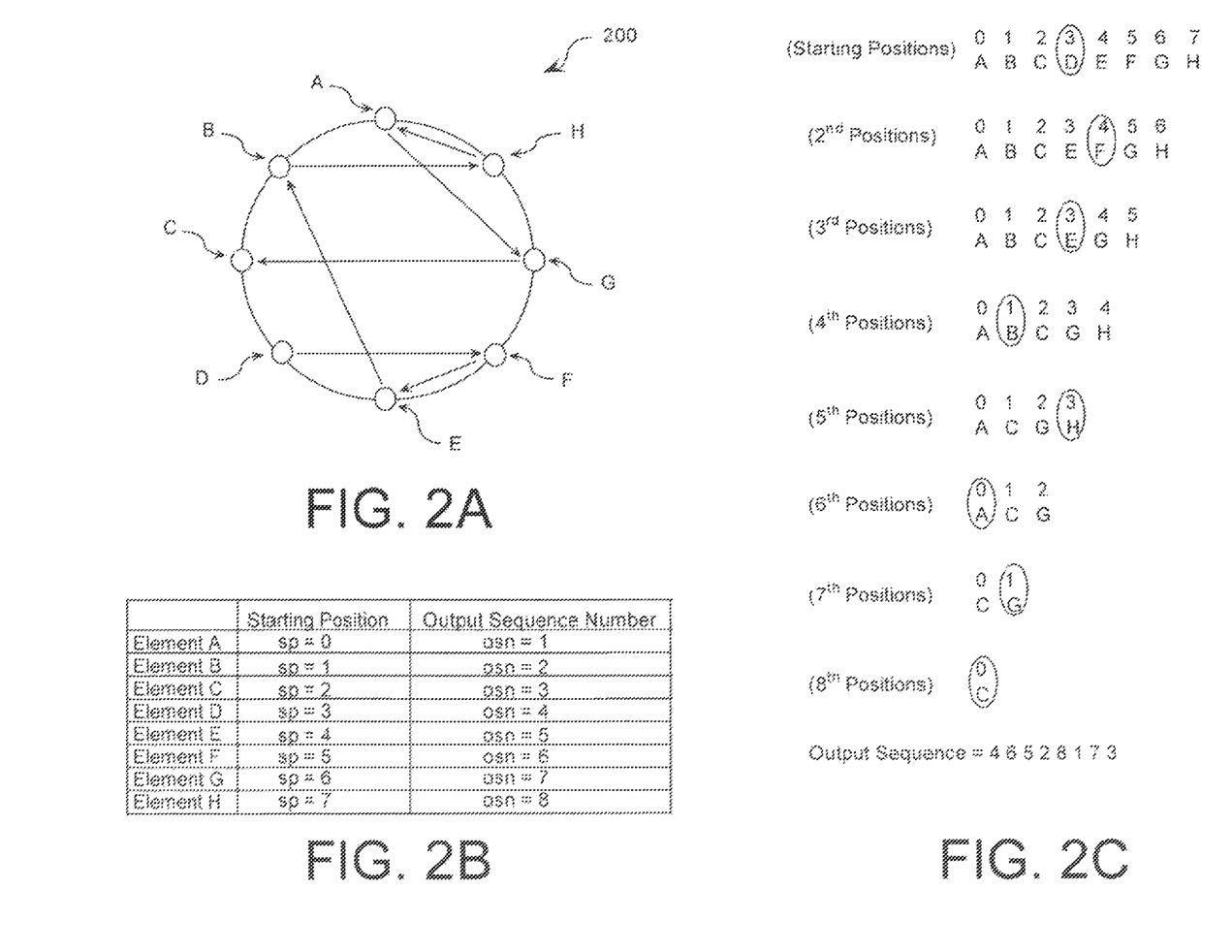
FIG. 2A is a schematic illustration of a cyclic structure that is useful for understanding the invention.
FIG. 2B is a table illustrating cyclic structure elements with associated starting position values and output sequence numbers that is useful for understanding the invention.
FIG. 2C is a schematic illustration of varying cyclic structure element positions that is useful for understanding the invention.

Referring now to FIGS. 2A-2B, the cyclic structure 200 is comprised of a plurality of elements A, B, . . . , H. The number of elements A, B, . . . , H is defined by the decimal number n of n!. As noted above, n! is the number of total possible values that the random number sequence $RN_0, \ldots, RN_N$ can equal. In order for the method disclosed herein to specify a particular one of the elements A, B, . . . , H, it is useful to assign each element a corresponding starting position value. According to an embodiment of the invention shown in FIGS. 2A-2B, the element A has a starting position zero (0). The element B has a starting position one (1). The element C has a starting position two (2), and so on. Still, the invention is not limited in this regard. For example, the element A can alternatively have a starting position one (1). The element B can alternatively have a starting position two (2). The element C can alternatively have a starting position three (3), and so on. Similarly, in order for the method disclosed herein lo specify a particular output sequence, it is useful to assign each element a corresponding output sequence number. According to the embodiment of the invention shown in FIGS. 2A-2B, the element A has a corresponding output sequence number of one (1). The element B has a corresponding output sequence number of two (2). The element C has a corresponding output sequence number of three (3), and so on. Still, the invention is not limited in this regard.

Referring again to FIG. 1 and FIGS. 2A-2C, a cyclic structure 200 sequence of elements is determined using all or a portion of the RNS residue values RV0, . . . , RVJ. For example, if there are eight (8) possible elements A, B, . . . , H in the cyclic structure 200, then a first number of the output sequence can be determined uniquely using any set of three residue value $RV0_{base2}$ digits (e.g., $b_1\ b_2\ b_3$). As should be understood, the digit set $b_1\ b_2\ b_3$ can have an associated decimal value of zero (0), one (1), two (2), three (3), four (4), five (5), six (6) or seven (7). For example, if the binary digits $b_1\ b_2\ b_3$ have the binary value of 0 0 0, then the binary value would convert to a decimal value of zero (0). In contrast, if the binary digits $b_1\ b_2\ b_3$ have the binary value of 1 1 1, then the binary value would convert to a decimal value of seven (7). If this digit set $b_1\ b_2\ b_3$ has an associated decimal value of three (3), then the starting element in the cyclic structure 200 sequence is an element having starting position three (3) within the elements A-H, i.e., element D as shown in FIG. 2C. Accordingly, a first number of the output sequence has a decimal value of four (4), i.e., the value of the output sequence number associated with the element D as shown in FIG. 2B.

Consequently, there are now seven (7) elements A, B, C, E, F, G, H to select as a second element in the cyclic structure 200 sequence. As such, a second number of the output sequence can be determined uniquely using a septiary digit of the residue value $RV3_{base7}$ (e.g., $s_1$). As should be understood, the septiary digit $s_1$ can have an associated decimal value of zero (0), one (1), two (2), three (3), four (4), five (5) or six (6). If the septiary digit $s_1$ has an associated decimal value of four (4), then the second element in the cyclic structure 200 sequence is the element in position four (4) within the elements A-C and E-H, i.e., element F as shown in FIG. 2C. The second number of the output sequence has a decimal value of six (6), i.e., the value of the output sequence number associated with the element F as shown in FIG. 2B.

There are now six (6) elements A, B, C, E, G, H to select as a third element in the cyclic structure 200 sequence. As such, a third number of the output sequence can be determined uniquely using a binary digit of the residue value $RV0_{base2}$ (e.g., $b_4$) and a tertiary digit $t_1$ of the RNS residue value $RV1_{base3}$ (e.g., $t_1$). As should be understood, the fourth binary digit $b_4$ can have a value of zero (0) or one (1). The first tertiary digit $t_1$ can have a value of zero (0), one (1) or two (2). These two mixed-radix digits may be combined via the Chinese Remainder Theorem (CRT) to obtain a single effective base-six digit value. Mixed-radix recombination via the CRT or similar methods is well understood by persons skilled in the art. Therefore, the CRT and similar methods will not be described in detail herein. If the fourth binary digit $b_4$ has a value of one (1) and the first tertiary digit $t_1$ has a value of zero (0), then the third element in the cyclic structure 200 sequence is the element in position three (3) within the elements A-C, E, and G-H, i.e., element E as shown in FIG. 2C. Notably, the position value of three (3) is obtained using the CRT. The third number in the output sequence has a decimal value of five (5), i.e., the value of the output sequence number associated with the element E as shown in FIG. 2B.

There are now five (5) elements A, B, C, G, H to select as a fourth element in the cyclic structure 200 sequence. As such, a fourth number of the output sequence can be determined uniquely using a pentiary digit of the RNS residue value $RV2_{base5}$ (e.g. $pt_1$). As should be understood, the pentiary digit $pt_1$ can have a decimal value of zero (0), one (1), two (2), three (3), or four (4). If the pentiary digit $pt_1$ has a decimal value of one (1), then the fourth element in the cyclic structure 200 sequence is the element in position one (1) within the elements A-C and G-H, i.e., element B as shown in FIG. 2C. The fourth number in the output sequence has a decimal value of two (2), i.e., the value of the output sequence number associated with the element B as shown in FIG. 2B.

There are now four (4) elements A, C, G, H to select as a fifth element in the cyclic structure 200 sequence. As such, a fifth number of the output sequence can be determined uniquely using a set of two RNS residue value $RV0_{base2}$ digits (e.g., $b_5\ b_6$). As should be understood, the binary digit set $b_5\ b_6$ can have an associated decimal value of zero (0), one (1), two (2) or three (3). For example, if the binary digit set $b_5\ b_6$ have a binary value of 0 0, then the binary value would convert to a decimal value of zero (0). In contrast, if the binary digit set $b_5\ b_6$ have a binary value of 1 1, then the binary value would convert to a decimal value of three (3). If the binary digit set $b_5\ b_6$ has a decimal value of three (3), then the fifth element in the cyclic structure 200 sequence is the element in position three (3) within the elements A, C, G, and H, i.e., element H as shown in FIG. 2C. The fifth number in the output sequence has a decimal value of eight (8), i.e., the value of the output sequence number associated with the element H as shown in FIG. 2B.

There are now three (3) elements A, C, G to select as a sixth element in the cyclic structure 200 sequence. As such, a sixth number of the output sequence can be determined uniquely using a tertiary digit of the RNS residue value $RV1_{base3}$ (e.g., $t_2$). As should be understood, the second tertiary digit $t_2$ can have a value of zero (0), one (1), or two (2). If the second tertiary digit $t_2$ has a decimal value of zero (0), then the sixth element in the cyclic structure 200 sequence is the element in position zero (0) within the elements A, C, and G, i.e., element A as shown in FIG. 2C. The sixth number in the output sequence has a decimal value of one (1), i.e., the value of the output sequence number associated with the element A as shown in FIG. 2B.

There are now two (2) elements C, G to select as a seventh element in the cyclic structure 200 sequence. As such, a seventh number of the output sequence can be determined uniquely using the last binary digit of the RNS residue value $RV0_{base2}$ (e.g., $b_7$). As should be understood, the seventh binary digit $b_7$ can have a value of zero (0) or one (1). If the seventh binary digit $b_7$ has a value of one (1), then the seventh element in the cyclic structure 200 sequence is the element in position one (1) within the elements C and G, i.e., element G as shown in FIG. 2C. The seventh number in the output sequence has a decimal value of seven (7), i.e., the value of the output sequence number associated with the element G as shown in FIG. 2B. Consequently, there is only one element C to select as an eighth element in the cyclic structure 200 sequence. As such, the eighth number of the output sequence has a decimal value of three (3), i.e., the value of the output sequence number associated with the element C as shown in FIG. 2B.

The above described process can be iteratively performed for each of a plurality of random numbers $RN_0, \ldots, RN_N$. In this regard, it should be appreciated that there are n! possible output sequences of numbers one (1) through n. As noted above, n! is the number of total possible values that the random numbers $RN_0, \ldots, RN_N$ can equal. Consequently, the ordering of numbers in a plurality of output sequences will not repeat until the n·n!+1 output.

The following Examples are provided in order to further illustrate the present invention. The scope of the invention, however, is not to be considered limited in any way thereby.

EXAMPLE 1

A random number $RN_0$ can have a decimal value of zero to forty thousand three hundred nineteen (40,319). As such, the total possible values that the random number $RN_0$ can equal is forty thousand three hundred twenty (40,320). Using the Fundamental Theorem of Arithmetic, the number forty thousand three hundred twenty (40,320) can be written as $8! = 8 \cdot 7 \cdot \ldots \cdot 1 = 2^7 \cdot 3^2 \cdot 5^1 \cdot 7^1$. In effect, a cyclic structure employed in such a scenario includes n elements, i.e. eight (8) elements.

Each RNS arithmetic operation employed for expressing the random number $RN_0$ as a RNS residue value $RV0, \ldots, RV3$ uses the relatively prime numbers $2^7, 3^2, 5^1, 7^1$ as the set of moduli $m_0^{km0}, m_1^{km1}, m_2^{km2}, m_3^{km3}$. Accordingly, the RNS residue values $RV0, \ldots, RV3$ can be defined by mathematical Equations (2-5).

$$RV0 = RN_0 \text{ modulo } 2^7 \quad (2)$$

$$RV1 = RN_0 \text{ modulo } 3^2 \quad (3)$$

$$RV2 = RN_0 \text{ modulo } 5^1 \quad (4)$$

$$RV3 = RN_0 \text{ modulo } 7^1 \quad (5)$$

The RNS residue value $RV0, \ldots, RV3$ can be computed by substituting the value of the random number $RN_0$ into the mathematical Equations (2-5). If the random number $RN_0$ equals ten thousand three hundred eleven (10,311), then the RNS residue value RV0 equals seventy-one (71). The RNS residue value RV1 equals six (6). The RNS residue value RV2 equals one (1). The RNS residue value RV3 equals zero (0). Accordingly, the RNS residue values $RV0, \ldots, RV3$ can be defined by mathematical Equations (8-9).

$$RV0 = RN_0 \text{ modulo } 2^7 = 71 \quad (6)$$

$$RV1 = RN_0 \text{ modulo } 3^2 = 6 \quad (7)$$

$$RV2 = RN_0 \text{ modulo } 5^1 = 1 \quad (8)$$

$$RV3 = RN0 \text{ modulo } 7^1 = 0 \quad (9)$$

Each RNS residue value $RV0, \ldots, RV3$ is expressed in a different base number system. Specifically, the RNS residue value RV0 is expressed in a base two system. As such, the RNS residue value $RV0_{base2}$ is a sequence of binary digits having values 1 0 0 0 1 1 1. The RNS residue value RV1 is expressed in a base three system. As such, the RNS residue value $RV1_{base3}$ is a sequence of tertiary digits having values 2 0. The RNS residue value RV2 is expressed in a base five system. As such, the RNS residue value $RV2_{base5}$ is a pentiary digit having a value 1. The RNS residue value RV3 is expressed in a base seven system. As such, the RNS residue value $RV3_{base7}$ is a septiary digit having a value 0. Accordingly, the RNS residue values $RV0_{base2}, \ldots, RV3_{base7}$ can be defined by mathematical Equations (10-13).

$$RV0_{base2} = RN_0 \text{ modulo } 2^7 = 71 = 1\ 0\ 0\ 0\ 1\ 1\ 1 \quad (10)$$

$$RV1_{base3} = RN_0 \text{ modulo } 3^2 = 6 = 2\ 0 \quad (11)$$

$$RV2_{base5} = RN_0 \text{ modulo } 5^1 = 1 = 1 \quad (12)$$

$$RV3_{base7} = RN_0 \text{ modulo } 7^1 = 0 = 0 \quad (13)$$

The first number of an output sequence is determined using the last three binary digits 1 1 1 of the RNS residue value $RV0_{base2}$. The second number of the output sequence is determined using the septiary digit 0 of the RNS residue value $RV3_{base7}$. The third number of the output sequence is determined using a fourth binary digit 0 of the RNS residue value $RV0_{base2}$ and a second tertiary digit 0 of the RNS residue value $RV1_{base3}$. The fourth number of the output sequence is determined using the pentiary digit 1 of the RNS residue value $RV2_{base5}$. The fifth number of the output sequence is determined using a second and third binary digit 0 0 of the RNS residue value $RV0_{base2}$. The sixth number of the output sequence is determined using a first tertiary digit 2 of the RNS residue value $RV1_{base3}$. The seventh number of the output sequence is determined using a first binary digit 1 of the RNS residue value $RV3_{base7}$. Consequently, the output sequence is 8 1 2 4 3 7 6 5.

EXAMPLE 2

A random number sequence of a size fifty-two factorial (52!) is chosen via any combination of number generation processes. The random number sequence of a size fifty-two factorial (52!) is approximately equal to eight times ten to the power of sixty-seven ($8 \cdot 10^{67}$). Using the Fundamental Theorem of Arithmetic, the number eight times ten to the power of sixty-seven ($8 \cdot 10^{67}$) can be written as $52! = 52 \cdot 51 \cdot \ldots \cdot 1 = 2^{49} \cdot 3^{23} \cdot 5^{12} \cdot 7^8 \cdot 11^4 \cdot 13^4 \cdot 17^3 \cdot 19^3 \cdot 23^2 \cdot 29^1 \cdot 31^1 \cdot 37^1 \cdot 41^1 \cdot 43^1 \cdot 47^1$. Alternately and more efficiently, a collection of fifteen (15) independent random number generators on each of the number bases can be used equivalently to produce an effective random number of size fifty-two factorial (52!). Following the same logic described above (in relation to FIGS. 1-2 and Example 1), a first number of an output sequence is determined using two (2) base-two digits and one (1) base-thirteen digit. A second number of an output sequence is determined using one (1) base-three digit and one (1) base-seventeen digit. A third number of an output sequence is determined using one (1) base-two digit and two (2) base-five digits, and so on. As should be understood, these mathematical operations may be implemented in hardware such that the same are performed in parallel. This parallel processing configuration results in a relatively quick and efficient computation.

EXAMPLE 3

A random number generator based on these combinatorial techniques can be constructed using an arbitrary mapping of n=233 elements as in cyclic ring 200, whose output is combined with some number of other cyclic ring generators. This combination may be performed using a method such as the Chinese Remainder Theorem, if the characteristics of the additional cyclic ring generators are odd primes exceeding two hundred thirty three (233), such as two hundred thirty nine (239), two hundred forty one (241), and two hundred fifty one (251), the effective repeat duration increases multiplicatively. Based on the four numbers in this example, the output sequence would only repeat after more than ten to the power of four hundred fifty nine ($10^{459}$) outputs. Moreover, the incorporation of these additional cyclic ring generators helps mask the deterministic properties of the permutation mapping.

Figure 3:
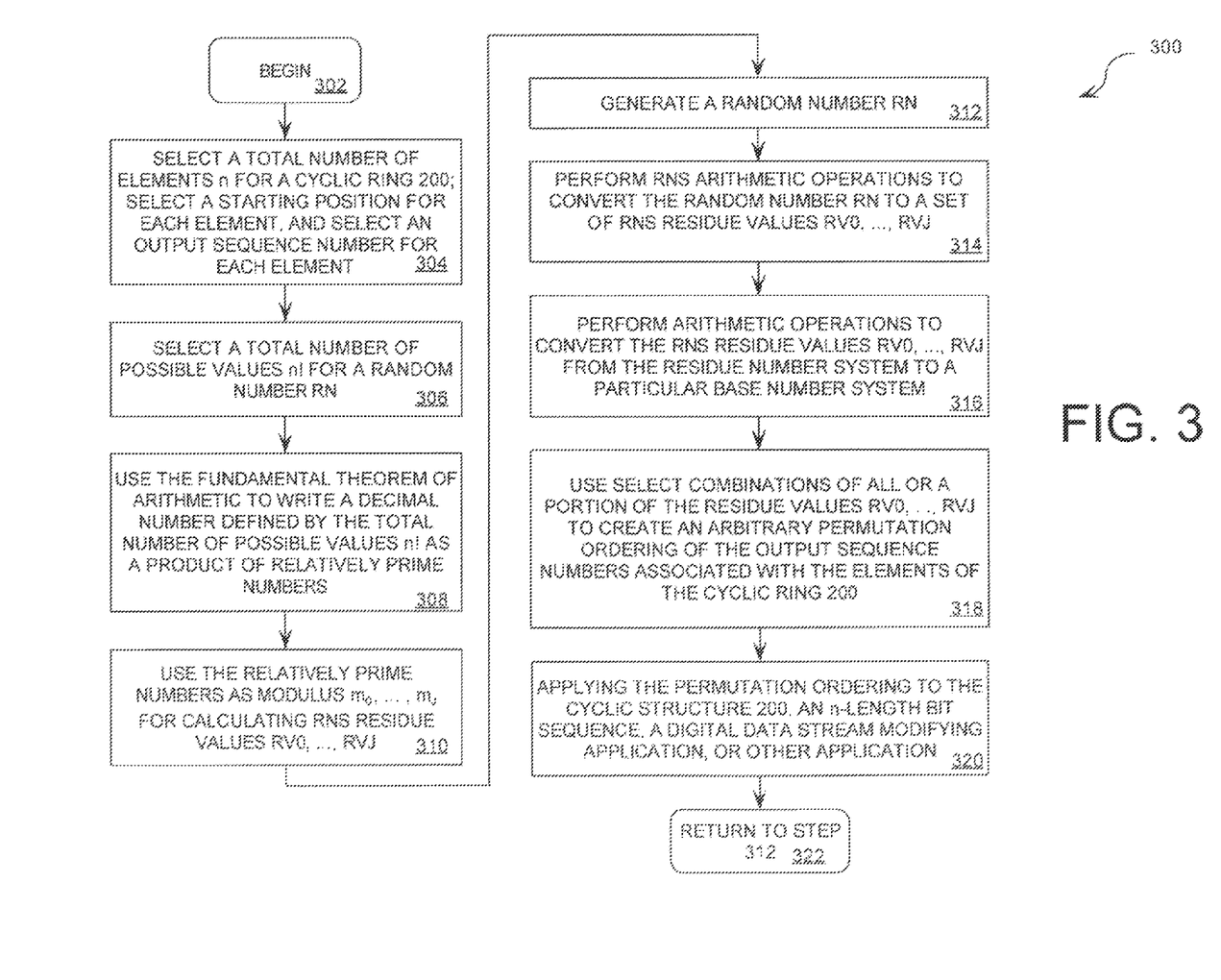
FIG. 3 is a flow diagram of a method for creating an arbitrary permutation ordering of numbers that is useful for understanding the invention.

Referring now to FIG. 3, there is provided a flow diagram of a method 300 for creating an arbitrary permutation ordering of numbers. The method 300 begins at step 302 and continues with step 304. In step 304, a total number of elements n for a cyclic structure 200 is selected. This step 304 also involves selecting a starting position for each element of the cyclic structure 200. For example, the element A has a position zero (0). The element B has a position of one (1). The element C has a position of two (2), and so on. This step 306 further includes selecting an output sequence number for each element. For example, an output sequence number associated with an element A has a value of one (1). An output sequence number associated with an element B has a value of two (2), and so on. Thereafter, step 306 is performed. Step 306 involves selecting the number of total possible values n! that a random number RN can equal.

As shown in FIG. 3, the method 300 continues with step 308. In step 308, a decimal number defined by the number of total possible values n! is written as a product of relatively prime numbers, in step 310, these relatively prime numbers are used as moduli $m_0^{km0}, m_1^{km1}, \ldots, m_J^{kmJ}$ for calculating RNS residue values RV0, . . . , RVJ. Subsequently, step 312 is performed where a random number RN is generated. Thereafter, RNS arithmetic operations are performed to convert the random number RN to a set of RNS residue values RV0, . . . , RVJ.

In step 316, arithmetic operations are performed to convert the RNS residue values RV0, . . . , RVJ from the residue number system to a base number system. The base number system includes, but is not limited to, a base-two system, a base-three system, a base-five system, a base-seven system, a base-eleven system, a base-thirteen system, a base-seventeen system, a base-nineteen system, a base twenty-three system, a base twenty-nine system, and a base thirty-one system. In this regard, it should be understood that each RNS residue values RV0, . . . , RVJ can be converted to a different base number system, Thereafter, step 318 is performed where select combinations of all or a portion of the RNS residue value RV0, . . . , RVJ are used to create a unique permutation ordering of the output sequence numbers. In this regard, it should be appreciated that the permutation ordering can be determined and applied to a cyclic structure such as that shown in FIG. 2A. In this regard, it should be understood that each output sequence number is associated with a certain element of the cyclic structure 200. Each combination of all or a portion of the RNS residue value RV0, . . . , RVJ is used to determine which element of the cyclic structure 200 has a position equal to a decimal value of said combination. Once the element is identified, the output sequence number associated with the element is added to an output sequence. After step 318, step 320 is performed. In step 320, the permutation ordering is applied to the cyclic structure 200, an n-length bit sequence, a data stream modifying application, or other application. In this regard, it should be understood that the generated member of the random sequence of numbers is output for subsequent use. For example, a digital data stream is modified using the output sequence numbers. Thereafter, step 322 is performed where the method 300 returns to step 312.

As should be appreciated, an output sequence has a permutation order that changes per cycle of steps 312-320. In other words, the permutation order of the output sequence numbers is unique for each random number zero (0), one (1), and n!–1. As such, the permutation order of each output sequence is seemingly random. Also, the permutation order of the output sequence numbers does not begin to repeat for n·n! outputs. As should also be appreciated, the method 300 can be used in a variety of communications system applications. For example, such a method can be advantageously implemented in a ring generator of a system based on the availability of random sequences. In such a scenario, the ring generator can produce an output sequence of numbers having an arbitrarily large chosen duration.

Figure 4:
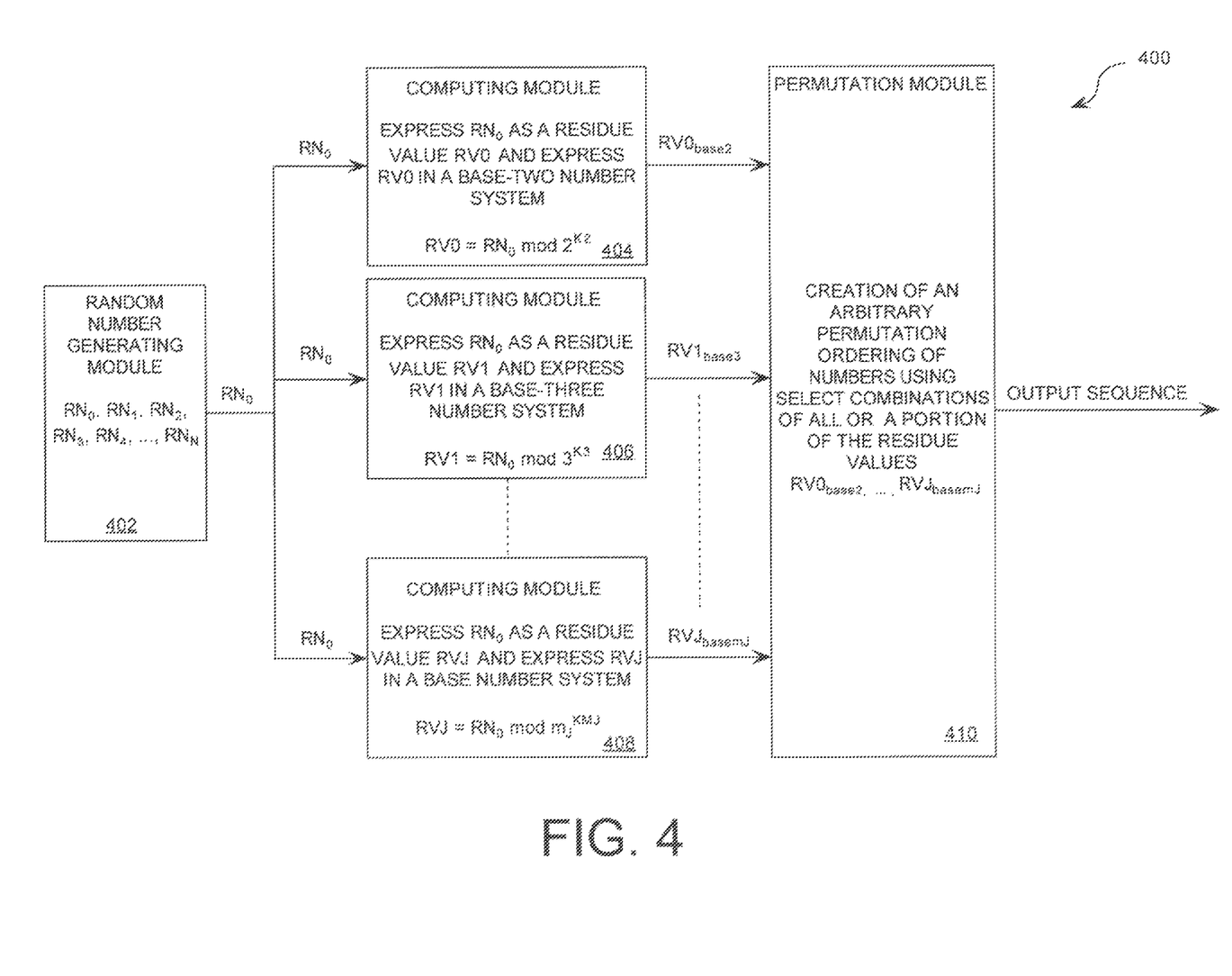
FIG. 4 is a block diagram of a ring generator that is useful for understanding the invention.

Referring now to FIG. 4, there is illustrated one embodiment of a ring generator 400 which could be used to implement the inventive arrangements. The ring generator 400 is comprised of a random number generating (RNG) module 402, computing modules 404, 406, 408, and a permutation module 410. The RNG module 402 is comprised of hardware and software configured for computing a sequence of random numbers $RN_0, \ldots, RN_N$ using some defined arithmetic process. Such arithmetic processes are well known to persons skilled in the art. Therefore, the defined arithmetic process will not be described in detail herein. However, if should be understood that the sequence of random numbers $RN_0, \ldots, RN_N$ can be any chosen sequence of pseudo-random numbers or pseudo-chaotic numbers, Referring again to FIG. 4, the RNG module 402 can also be comprised of hardware and software configured for converting the random number sequence $RN_0, \ldots, RN_N$ from a decimal number system to a binary number system. In this regard, it should be understood that a random numbers $RN_0, \ldots, RN_N$ expressed in a binary number system representation includes a sequence of digits having a zero (0) value or a one (1) value. As such, the binary number system representation has a certain digit length BL (e.g., eight digits). The RNG module 402 is further comprised of hardware and software configured for communicating the random numbers $RN_0, \ldots, RN_N$ to the computing modules 404, 406, 406.

Each computing module 404, 406, 408 is comprised of hardware and software configured for performing an RNS arithmetic operation to convert a random number in the sequence $RN_0, \ldots, RN_N$ to a set of RNS residue values RV0, . . . , RVJ. In this regard, it should be understood that each RNS arithmetic operation employed for expressing a random number in the sequence $RN_0, \ldots, RN_N$ as a set of RNS residue values RV0, ..., RVJ uses a different relatively prime number as a moduli $m_0^{km0}, m_1^{km1}, \ldots, m_J^{kmJ}$. Each relatively prime number is defined by a decimal number equal to a number of total possible values n! that each random number $RN_0, \ldots, RN_N$ can equal. The decimal number is expressed as a product of relatively prime numbers. These relatively prime numbers are used as the moduli $m_0^{km0}, m_1^{km1}, \ldots, m_J^{kmJ}$.

Referring again to FIG. 4, each computing module 404, 400, 408 is also comprised of hardware and software configured for converting each RNS residue value RV0, ..., RVJ from a residue number system to a base number system. In this regard, it should be understood that each computing module 404, 408, 408 is configured to convert a respective RNS residue value RV0, ..., RVJ from a residue number system to a particular base number system. For example, the computing module 404 is configured to convert the RNS residue value RV0 to a base two system. The computing module 408 is configured to the RNS residue value RV1 to a base three system. The computing module 408 is configured to the RNS residue value RVJ to a base seven system. Still, the invention is not limited in this regard.

Each computing module 404, 406, 408 is further comprised of hardware and software configured for communicating a respective residue value RV0, ..., RVJ to the permutation module 410. The permutation module 410 is comprised of hardware and software configured for using select combinations of all or portion of the RNS residue values RV0, ..., RVJ to create an arbitrary permutation ordering of the output sequence numbers. The permutation module 410 is also comprised of hardware and software configured for generating an output comprised of a unique permutation ordering of the output sequence numbers. In this regard, it should be appreciated that the permutation ordering is determined and applied to a cyclic structure such as that shown in FIG. 2A. In this regard, it should be appreciated that each output sequence number is associated with a certain element of the cyclic structure 200. Each combination of all or a portion of the RNS residue value RV0, ..., RVJ is used to determine which element of the cyclic structure has a position equal to a decimal value of said combination. Once the element is identified, the output sequence number associated with the element is added to the output sequence. The permutation module 410 is further comprised of hardware and software configured for communicating an output sequence to an external device (not shown). The external device can be configured for modifying a digital data stream using output sequence numbers contained in an output sequence. According to an aspect of the invention, the permutation module 410 is configured to use the Chinese Remainder Theorem to combine with one or more additional cyclic ring generators. Still, the invention is not limited in this regard.

A person skilled in the art will appreciate that the ring generator 400 is one architecture of a RNS-based permutation mapping. However, the invention is not limited in this regard and any other ring generator architecture can be used without limitation.

In light of the foregoing description of the invention, it should be recognized that the present invention can be realized in hardware, software, or a combination of hardware and software. A method of generating an arbitrary permutation ordering of digits according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or an FPGA could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the present invention in any way, except as set forth in the following claims.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fail within the scope of the appended claims.

We claim:

1. A method for extending a sequence repetition period of a random number generator in a communications system based on the availability of a random sequence, comprising:

performing, by a ring generator circuit, a plurality of residue number system (RNS) arithmetic operations to express a random number in a random number sequence as a plurality of RNS residue values;

converting, by said ring generator circuit, each of said plurality of RNS residue values to a relatively prime number system so that each of said plurality of RNS residue values includes at least one digit;

generating, by said ring generator circuit, an arbitrary permutation ordering of a plurality of output sequence numbers using a select combination of digits associated with each of said plurality of RNS residue values, wherein said arbitrary permutation ordering is determined using a cyclic structure; and combining, by said communication system, said plurality of output sequence numbers having said arbitrary permutation ordering with respective output sequence bits defining information to be transmitted from said communications system.

2. The method according to claim 1, wherein said cyclic structure has n elements and said random number has a value which can range between zero and n!–1.

3. The method according to claim 2, wherein each of said plurality of output sequence numbers is associated with a respective element of said n elements.

4. The method according to claim 1, further comprising calculating, by said ring generator circuit, said plurality of RNS residue values using relatively prime numbers as moduli, wherein said moduli are determined by determining a decimal number defined by n! as a product of relatively prime numbers.

5. The method according to claim 1, wherein said converting step further comprises converting each of said plurality of RNS residue values to a different relatively prime number system.

6. The method according to claim 1, wherein said select combination of digits are chosen so that a range of values which can be determined by said digits is equal to a number of available unselected elements in said cyclic structure.

7. The method according to claim 1, further comprising using, at said ring generator circuit, a value of said select combination of digits to select an available unselected element in said cyclic structure.

8. The method according to claim 1, wherein said generating step further comprises using a Chinese Remainder Theorem to combine at least two digits associated with at least two RNS residue values to obtain a digit having a different number base than said at least two digits.

9. The method according to claim 8, further comprising using, by said ring generator circuit, said digit having a different number base to select an available unselected element in said cyclic structure.

10. A ring generator, comprising:
at least one electronic circuit configured for:
performing a plurality of RNS arithmetic operations to express a random number in a random number sequence as a plurality of RNS residue values;
converting each of said plurality of RNS residue values to a relatively prime number system so that each of said plurality of RNS residue values includes at least one digit;
generating an arbitrary permutation ordering of a plurality of output sequence numbers using a select combination of digits associated with each of said plurality of RNS residue values, wherein said arbitrary permutation ordering is determined using a cyclic structure; and
combining said plurality of output sequence numbers in said arbitrary permutation ordering with a plurality of output sequence bits defining information to be transmitted from a communications system.

11. The ring generator according to claim 10, wherein said random number has a value within a range of zero to n!−1 and said cyclic structure has n elements.

12. The ring generator according to claim 11, wherein each of said plurality of output sequence numbers is associated with a respective element of said n elements.

13. The ring generator according to claim 10, wherein said electronic circuit is further configured for calculating said plurality of RNS residue values using relatively prime numbers as moduli, wherein said relatively prime numbers are selected to have a product equal to a decimal number defined by n!.

14. The ring generator according to claim 10, wherein said electronic circuit is further configured for converting each of said plurality of RNS residue values to a different relatively prime number system.

15. The ring generator according to claim 10, wherein said select combination of digits are chosen so that a range of values which can be determined by said digits is equal to a number of available unselected elements in said cyclic structure.

16. The ring generator according to claim 10, wherein said electronic circuit is further configured for using a value of said selected combination of digits to select an available unselected element in said cyclic structure.

17. The ring generator according to claim 10, wherein said electronic circuit is further configured for using a Chinese Remainder Theorem to combine at least two digits associated with at least two RNS residue values to obtain a digit having a different number base than said at least two digits.

18. The ring generator according to claim 17, wherein said electronic circuit is further configured for using said digit having a different number base to select an available unselected element in said cyclic structure.

19. The ring generator according to claim 10, wherein said electronic circuit is further configured for using a Chinese Remainder Theorem to combine with one or more additional cyclic ring generators.

20. A device comprising a machine-readable storage medium having stored thereon instructions, which when executed by said device, cause the device to perform the following operations comprising:
performing a plurality of RNS arithmetic operations to express a random number in a random number sequence as a plurality of RNS residue values;
converting each of said plurality of RNS residue values to a relatively prime number system so that each of said plurality of RNS residue values includes at least one digit;
generating an arbitrary permutation ordering of a plurality of output sequence numbers using a select combination of digits associated with each of said plurality of RNS residue values, wherein said arbitrary permutation ordering is determined using a cyclic structure; and
combining said plurality of output sequence numbers in said arbitrary permutation ordering with a plurality of output sequence bits defining information to be communicated from said device.

21. The device according to claim 20, wherein said random number has a value between zero and n!−1, said cyclic structure has n elements, and each of said plurality of output sequence numbers is associated with a respective element of said n elements.

22. The device according to claim 20, wherein said machine-readable storage medium further comprises instructions to cause said device to perform the operation of calculating said plurality of RNS residue values using relatively prime numbers as moduli, wherein said relatively prime numbers are to have a product equal to a decimal number defined by n!.

23. The device according to claim 20, wherein said machine-readable storage medium further comprises instructions to cause said device to perform the operation of converting each of said plurality of RNS residue values to a different relatively prime number system.

24. The device according to claim 20, wherein said machine-readable storage medium further comprises instructions to cause the operation of choosing said select combination of digits so that a range of values which can be determined by said digits is equal to a number of available unselected elements in said cyclic structure.

25. The device according to claim 20, wherein said machine-readable storage medium further comprises instructions to cause said device to perform the operation of using a value of said select combination of digits to select an available unselected element in said cyclic structure.

26. The device according to claim 20, wherein said machine-readable storage medium further comprises instructions to cause said device to perform the operation of using a Chinese Remainder Theorem to combine at least two digits associated with at least two RNS residue values to obtain a digit having a different number base than said at least two digits.

27. The device according to claim 26, wherein said machine-readable storage medium further comprises instructions to cause said device to perform the operation of using said digit having a different number base to select an available unselected element in said cyclic structure.

* * * * *